US012807009B2

(12) United States Patent
Harada et al.

(10) Patent No.: US 12,807,009 B2
(45) Date of Patent: Nov. 24, 2026

(54) PLUG-IN HYBRID ELECTRIC VEHICLE

(71) Applicant: TOYOTA JIDOSHA KABUSHIKI KAISHA, Toyota (JP)

(72) Inventors: Taku Harada, Nisshin (JP); Makoto Tomita, Nagoya (JP); Takahiro Kawashima, Chiryu (JP); Shoichi Sasaki, Seto (JP); Chikashi Ohta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 18/971,222

(22) Filed: Dec. 6, 2024

(65) Prior Publication Data

US 2025/0222790 A1 Jul. 10, 2025

(30) Foreign Application Priority Data

Jan. 4, 2024 (JP) ................................ 2024-000339

(51) Int. Cl.

| | |
|---|---|
| ***B60L 50/60*** | (2019.01) |
| ***B60L 50/61*** | (2019.01) |
| ***B60L 53/16*** | (2019.01) |
| ***B60L 53/22*** | (2019.01) |
| ***H02G 3/08*** | (2006.01) |

(52) U.S. Cl.

CPC ............... *B60L 50/66* (2019.02); *B60L 50/61* (2019.02); *B60L 53/16* (2019.02); *B60L 53/22* (2019.02); *H02G 3/08* (2013.01); *B60L 2210/00* (2013.01)

(58) Field of Classification Search

CPC .......... B60L 50/66; B60L 50/61; B60L 53/16; B60L 53/22; B60L 2210/00; H02G 3/08

See application file for complete search history.

(56) References Cited

U.S. PATENT DOCUMENTS

| | | | | |
|---|---|---|---|---|
| 7,900,728 | B2 * | 3/2011 | Suzuki | B60K 1/04 180/68.5 |
| 10,994,795 | B1 * | 5/2021 | Perez | B60K 15/067 |
| 11,142,270 | B1 * | 10/2021 | Perez | B60L 50/64 |
| 2004/0232672 | A1 * | 11/2004 | Bandoh | B60N 2/793 280/735 |
| 2012/0118655 | A1 | 5/2012 | Ogihara et al. | |

(Continued)

FOREIGN PATENT DOCUMENTS

| | | | | |
|---|---|---|---|---|
| CN | 109278873 | A | 1/2019 | |
| EP | 4582275 | A1 * | 7/2025 | B60K 6/40 |

(Continued)

*Primary Examiner* — Jacob B Meyer

(74) *Attorney, Agent, or Firm* — Oliff PLC

(57) ABSTRACT

A minivan-type plug-in hybrid electric vehicle includes a first-row seat, a second-row seat, and a slide rail, which are disposed on a floor panel forming a floor surface of a passenger compartment. In the vehicle front-rear direction, the first-row seat is positioned rearward of the front wheels, and the second-row seat is positioned rearward of the first-row seat and forward of the rear wheels. The second-row seat is slidable along the slide rail on the floor panel in the vehicle front-rear direction. A battery, a fuel tank, and an exhaust pipe are disposed below the floor panel. The vehicle on-board charger is disposed on the floor panel so as to be positioned rearward of the axle of the rear wheels in the vehicle front-rear direction.

6 Claims, 5 Drawing Sheets

(56) References Cited

U.S. PATENT DOCUMENTS

| | | | | |
|---|---|---|---|---|
| 2013/0235526 | A1* | 9/2013 | Watanabe | B60K 1/00 361/699 |
| 2014/0232184 | A1* | 8/2014 | Ukai | B60K 1/00 307/10.1 |
| 2017/0106743 | A1* | 4/2017 | Ajisaka | B62D 25/20 |
| 2017/0232866 | A1* | 8/2017 | Sugizaki | B60L 3/0007 180/242 |
| 2018/0056752 | A1* | 3/2018 | Ogawa | B60H 1/00278 |
| 2018/0072352 | A1* | 3/2018 | Shimoda | B60K 6/28 |
| 2020/0079205 | A1* | 3/2020 | Ohkuma | B60K 6/26 |
| 2021/0339617 | A1 | 11/2021 | Ohkuma et al. | |
| 2022/0371421 | A1 | 11/2022 | Tanizawa | |
| 2025/0222756 | A1* | 7/2025 | Tomita | B60K 15/063 |
| 2025/0222757 | A1* | 7/2025 | Kawashima | B60K 6/26 |
| 2025/0222758 | A1* | 7/2025 | Harada | B60K 6/20 |
| 2025/0222790 | A1* | 7/2025 | Harada | B60L 53/22 |
| 2025/0222796 | A1* | 7/2025 | Ohta | B60L 53/14 |

FOREIGN PATENT DOCUMENTS

| | | | | |
|---|---|---|---|---|
| EP | 4582276 | A1 * | 7/2025 | B60K 6/40 |
| EP | 4582277 | A1 * | 7/2025 | B60K 13/04 |
| EP | 4582279 | A2 * | 7/2025 | B60N 2/06 |
| JP | 2013067255 | A | 4/2013 | |
| JP | 2018-030448 | A | 3/2018 | |
| JP | 2021-104759 | A | 7/2021 | |
| JP | 2021-160519 | A | 10/2021 | |
| KR | 20250107103 | A * | 7/2025 | B60L 53/16 |
| WO | 2011/013634 | A1 | 2/2011 | |
| WO | 2020/044792 | A1 | 3/2020 | |
| WO | 2021/145057 | A1 | 7/2021 | |

* cited by examiner

PLUG-IN HYBRID ELECTRIC VEHICLE

CROSS-REFERENCE TO RELATED APPLICATIONS

This application is based upon and claims the benefit of priority from Japanese Patent Application No. 2024-000339, filed on Jan. 4, 2024, the entire contents of which are incorporated herein by reference.

BACKGROUND

1. Field

The present disclosure relates to a plug-in hybrid electric vehicle that can be connected to an external electrical power supply to charge its battery.

2. Description of Related Art

Japanese Laid-Open Patent Publication No. 2021-160519 discloses a structure for a hybrid electric vehicle, which includes an engine and a drive motor as its drive sources. In this vehicle, the battery, high-voltage components, and exhaust system components are compactly arranged beneath the floor panel.

A minivan-type vehicle is equipped with a sliding seat as the second-row seat and a sliding door. The sliding seat is capable of sliding along the floor in the vehicle's longitudinal direction. To ensure a sufficient sliding range for the sliding seat, long slide rails must be installed on the floor. Therefore, in a minivan-type vehicle, it is desirable for the floor behind the first-row seats to have a low, flat structure.

A plug-in hybrid electric vehicle, which can charge its battery by connecting to an external electrical power supply, requires a larger battery than a hybrid electric vehicle that does not have such a configuration.

Accordingly, in a minivan-type plug-in hybrid electric vehicle, it is necessary to examine the arrangement of high-voltage components that allows for both the installation of a large battery and a low, flat floor to ensure a spacious passenger compartment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A plug-in hybrid electric vehicle of one aspect of the present disclosure is a minivan-type plug-in hybrid electric vehicle in which a passenger compartment and a cargo space are not separated by a partition. The plug-in hybrid electric vehicle includes power sources including an engine and a motor, a fuel tank configured to store fuel to be supplied to the engine, a battery configured to store electric power to be supplied to the motor, a vehicle on-board charger configured to charge the battery with power supplied from outside of the plug-in hybrid electric vehicle, a converter configured to convert a voltage of electric power supplied from the battery, a power transmission mechanism configured to transmit rotational power of the engine and the motor to front wheels, an inverter configured to drive the motor, an exhaust pipe configured to guide exhaust gas from the engine rearward in the vehicle front-rear direction, a first-row seat arranged on a floor panel that forms a floor surface of the passenger compartment, a second-row seat disposed on the floor panel so as to be positioned rearward of the first-row seat in the vehicle front-rear direction, and a slide rail disposed on the floor panel so as to extend in the vehicle front-rear direction. The engine, the motor, the power transmission mechanism, and the inverter are disposed in the engine compartment. In the vehicle front-rear direction, the first-row seat is positioned rearward of the front wheels, and the second-row seat is positioned forward of the rear wheels. The second-row seat is configured to be slidable on the floor panel along the slide rail in the vehicle front-rear direction. The battery, the fuel tank, and the exhaust pipe are disposed under the floor panel. The vehicle on-board charger is disposed on the floor panel so as to be positioned rearward of an axle of the rear wheels in the vehicle front-rear direction.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A plug-in hybrid electric vehicle 1 according to one embodiment will now be described with reference to FIGS. 1 to 8. In the following description, terms related to orientations or directions, such as "front", "rear", "upper", "lower", "right", and "left", are defined based on the plug-in hybrid electric vehicle 1.

External Structure of the Plug-In Hybrid Electric Vehicle 1

Figure 1:
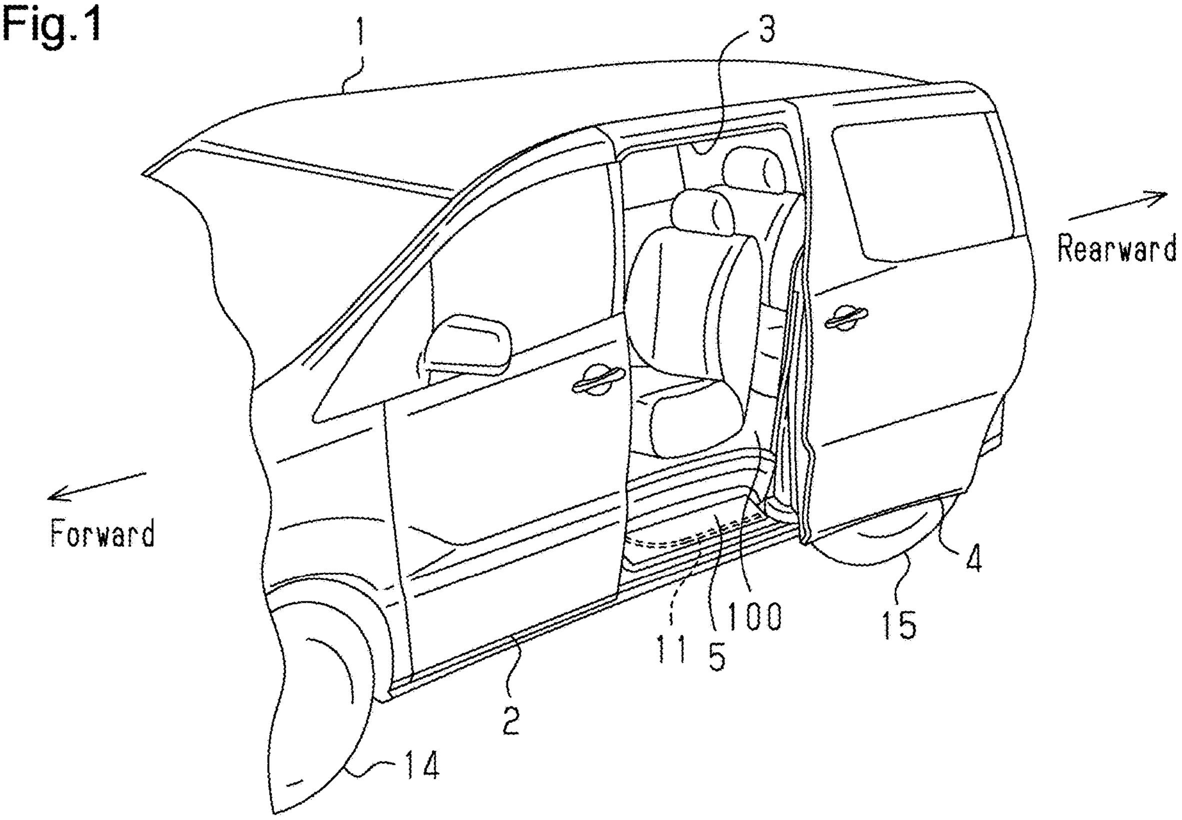
FIG. 1 is a schematic diagram of a minivan-type plug-in hybrid electric vehicle according to an embodiment.

FIG. 1 is a schematic diagram of the plug-in hybrid electric vehicle 1 according to the present embodiment. The plug-in hybrid electric vehicle 1 has a left side surface, which is one of a first side surface and a second side surface, and a right side surface, which is the other of the first side surface and the second side surface. As shown in FIG. 1, the plug-in hybrid electric vehicle 1 includes a front door 2, an opening 3, and a sliding door 4, which are on the left side surface. Likewise, the plug-in hybrid electric vehicle 1 includes a front door 2, an opening 3, and a sliding door 4 on the right side surface.

The opening 3 is opened and closed by the sliding door 4, which moves in the vehicle front-rear direction. A step panel 5 is disposed in a lower portion of the opening 3. The step panel 5 is disposed below a floor panel 100, which forms a floor surface of the plug-in hybrid electric vehicle 1. A guide rail 11 extending in the vehicle front-rear direction is fixed to a lower surface of the step panel 5. A front end of the guide rail 11 is positioned rearward of a front wheel 14. A rear end of the guide rail 11 is positioned forward of a rear wheel 15.

Figure 2:
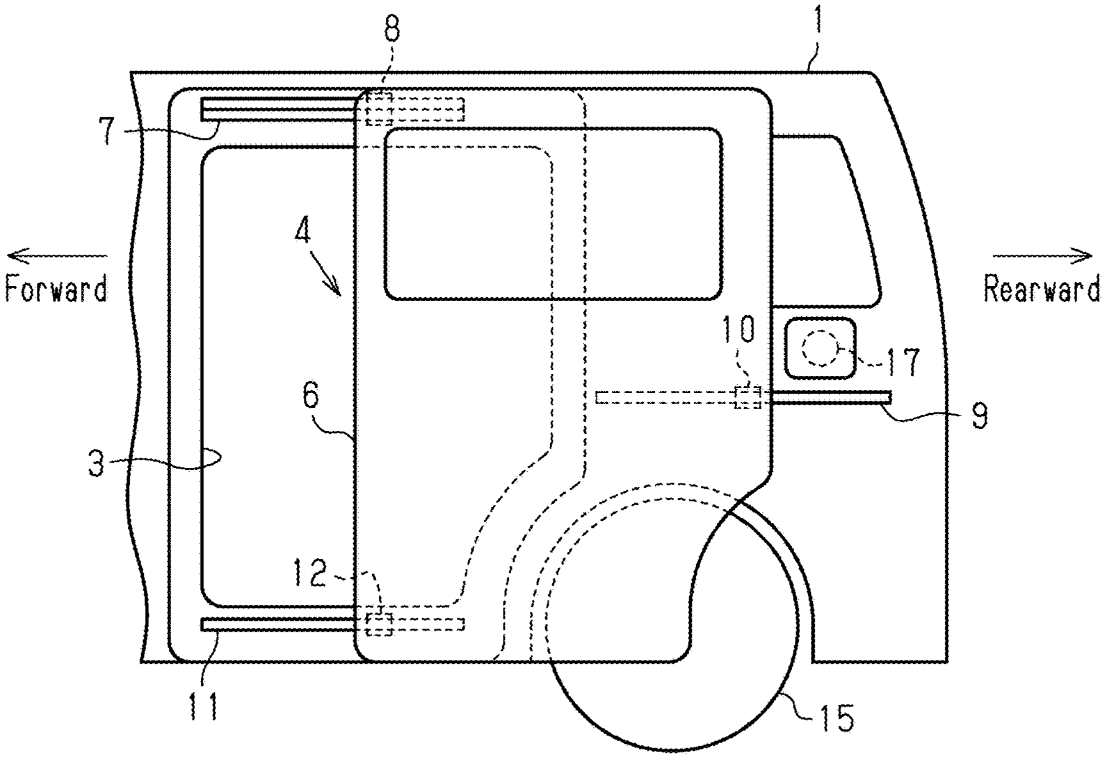
FIG. 2 is a side view of a sliding door provided in the plug-in hybrid electric vehicle of FIG. 1 as viewed from the left side.

FIG. 2 is a side view of the left sliding door 4 as viewed from the left side. As shown in FIG. 2, the fuel inlet 17 is disposed on the left side surface of the plug-in hybrid electric vehicle 1 and rearward of the sliding door 4. An upper rail 7, a center rail 9, and a guide rail 11 are disposed around the opening 3. The upper rail 7 is disposed above the opening 3. The guide rail 11 is disposed below the opening 3. The center rail 9 is disposed rearward of the opening 3 on the side surface of the vehicle 1. The position of the center rail 9 in the vehicle height direction is below the upper rail 7 and above the guide rail 11.

The sliding door 4 includes a sliding door body 6, an upper hinge unit 8, a center hinge unit 10, and a guide hinge unit 12. The upper hinge unit 8 and the guide hinge unit 12 are fixed to parts of the sliding door body 6 near the front end in a vehicle length direction. The center hinge unit 10 is fixed to a part of the sliding door body 6 near the rear end in the vehicle length direction. The vehicle length direction coincides with the vehicle front-rear direction.

The upper hinge unit 8 is fixed to an upper end portion of the sliding door body 6. The guide hinge unit 12 is fixed to a lower end portion of the sliding door body 6. The center hinge unit 10 is fixed to a central portion of the sliding door body 6 in the vertical direction.

The upper hinge unit 8 is movably supported by the upper rail 7. The center hinge unit 10 is movably supported by the center rail 9. The guide hinge unit 12 is movably supported by the guide rail 11. Thus, the upper hinge unit 8, the center hinge unit 10, and the guide hinge unit 12 connect the sliding door body 6 to the side surface of the vehicle 1. The upper hinge unit 8 moves along the upper rail 7. The center hinge unit 10 moves along the center rail 9. The guide hinge unit 12 moves along the guide rail 11. The sliding door body 6 thus moves relative to the side surface of the vehicle 1. The upper rail 7, the center rail 9, and the guide rail 11 define the moving direction of the sliding door 4.

Figure 3:
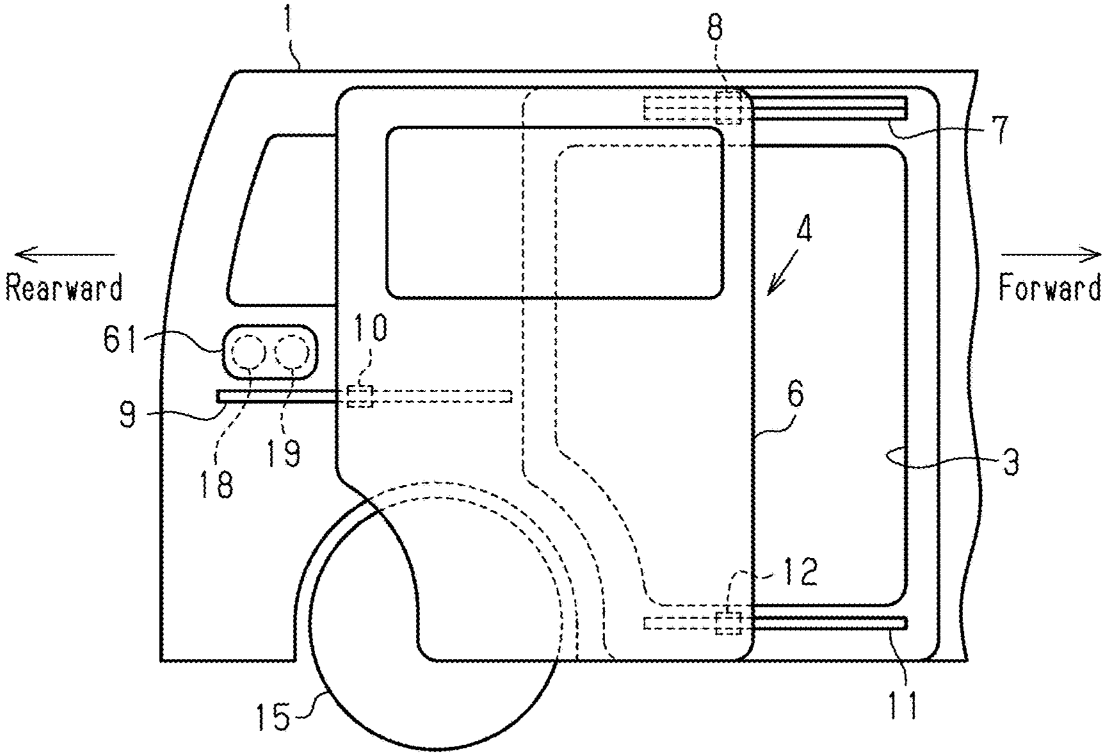
FIG. 3 is a side view of a sliding door provided in the plug-in hybrid electric vehicle of FIG. 1 as viewed from the right side.

FIG. 3 is a side view of the right sliding door 4 as viewed from the right side. As shown in FIG. 3, a charging lid 61 is disposed on the right side surface of the plug-in hybrid electric vehicle 1 and rearward of the sliding door 4. A first charging port 18 and a second charging port 19, which will be discussed below, are disposed inside the charging lid 61.

Internal Structure of the Plug-In Hybrid Electric Vehicle 1

Figure 4:
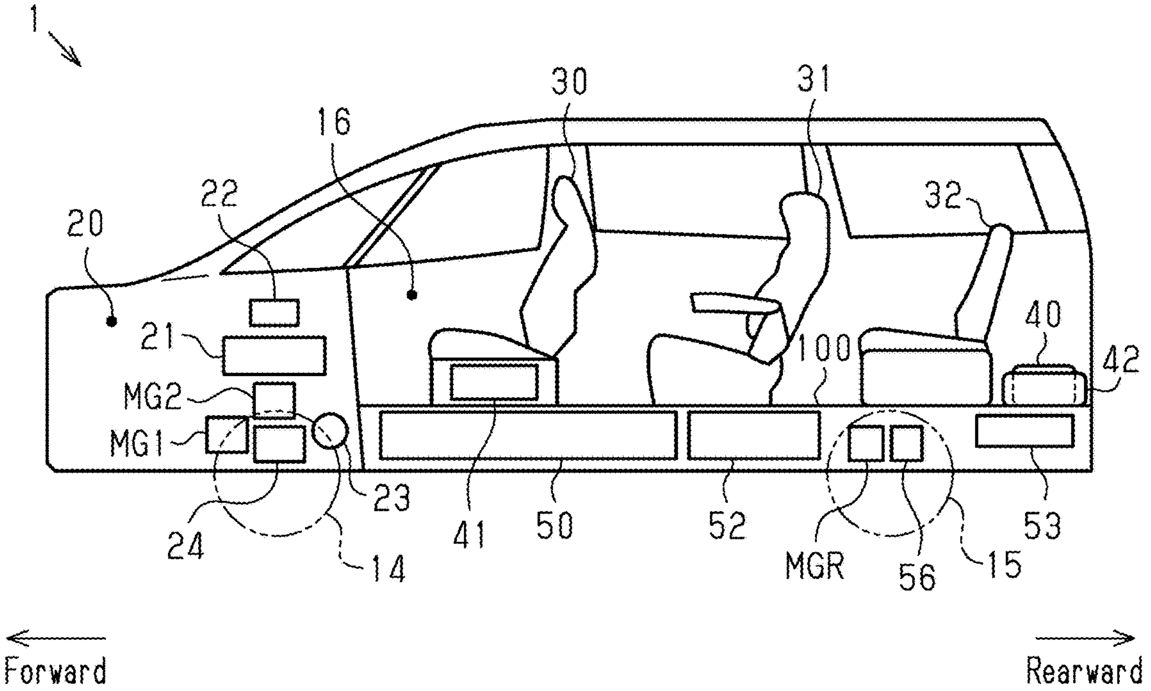
FIG. 4 is a schematic diagram of an internal structure of the plug-in hybrid electric vehicle shown in FIG. 1.

FIG. 4 is a side view schematically showing an internal structure of the plug-in hybrid electric vehicle 1. As shown in FIG. 4, the plug-in hybrid electric vehicle 1 is a minivan-type vehicle in which a passenger compartment 16 and a cargo space are not separated by a partition. The plug-in hybrid electric vehicle 1 includes an engine compartment 20 forward of the passenger compartment 16. The engine compartment 20 accommodates, as power sources, an engine 21, a first motor-generator MG1, a second motor-generator MG2, a power control unit 22, a power split mechanism 23, and a speed reduction mechanism 24.

First-row seats 30, second-row seats 31, and third-row seats 32 are disposed on the floor panel 100. The second-row seats 31 are positioned rearward of the first-row seats 30. In the vehicle side view, the first-row seats 30 are positioned rearward of the front wheels 14. In the vehicle side view, the second-row seats 31 are positioned forward of the rear wheels 15.

As shown in FIG. 4, a junction box 41 is disposed below the first-row seats 30 and above the floor panel 100. The junction box 41 is a high-voltage component. Details of the junction box 41 will be described later.

A vehicle on-board charger 40 and a DC/DC converter 42 are disposed rearward of the axle of the rear wheels 15 and above the floor panel 100. Details of the vehicle on-board charger 40 and the DC/DC converter 42 will be described later. The vehicle on-board charger 40 and the DC/DC converter 42 are high-voltage components.

A battery 50, a fuel tank 52, a muffler 53, a rear-wheel drive motor-generator MGR, and a rear-wheel speed reduction mechanism 56 are disposed under the floor panel 100. The battery 50 is configured to store electric power to be supplied to the first motor-generator MG1, the second motor-generator MG2, and the rear-wheel drive motor-generator MGR. The fuel tank 52 is configured to store fuel to be supplied to the engine 21. The muffler 53 is configured to reduce exhaust noise.

The fuel tank 52 is disposed rearward of the battery 50. The rear-wheel drive motor-generator MGR is disposed rearward of the fuel tank 52. The muffler 53 is disposed rearward of the rear-wheel drive motor-generator MGR.

Figure 5:
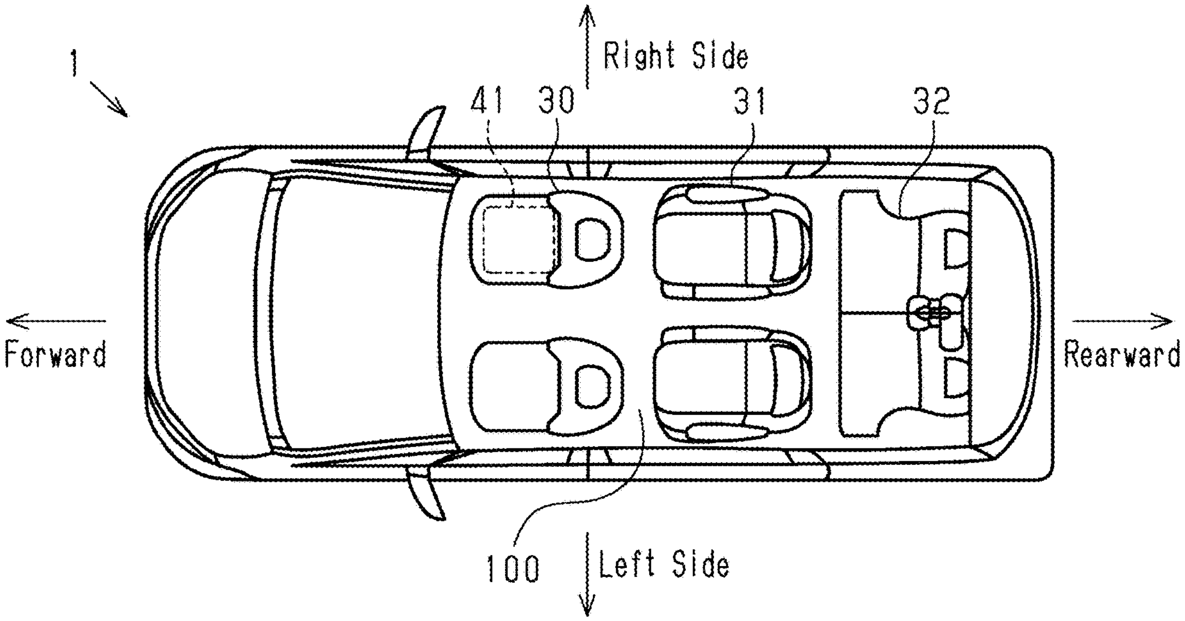
FIG. 5 is a schematic diagram of an arrangement of seats in the plug-in hybrid electric vehicle shown in FIG. 1.

FIG. 5 is a plan view schematically showing the arrangement of the seats. As shown in FIG. 5, the first-row seats 30 include a driver's seat and a front passenger seat. The second-row seats 31 include two independent seats. The third-row seats 32 are positioned rearward of the second-row seats 31.

Devices Disposed on the Floor Panel 100

Figure 6:
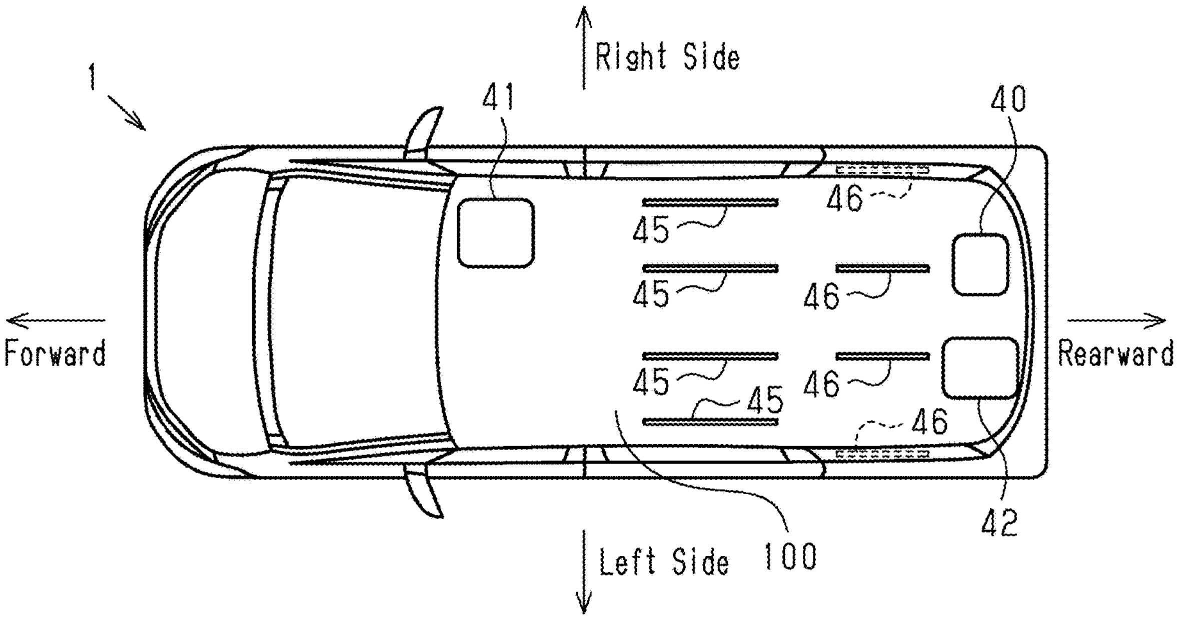
FIG. 6 is a schematic diagram of an arrangement of devices disposed on a floor panel in the plug-in hybrid electric vehicle shown in FIG. 1.

FIG. 6 is a plan view schematically showing the arrangement of devices disposed on the floor panel 100. As shown in FIG. 6, a vehicle on-board charger 40, a junction box 41, and a DC/DC converter 42 are disposed on the floor panel 100.

Four first slide rails 45 extending in the vehicle front-rear direction are disposed rearward of the junction box 41. Four second slide rails 46 extending in the vehicle front-rear direction are disposed rearward of the first slide rails 45. The first slide rails 45 are all disposed on the floor panel 100. Two of the four second slide rails 46 at the center in the vehicle width direction are disposed on the floor panel 100. The remaining two second slide rails 46 are disposed on the side surfaces of the vehicle 1 in the passenger compartment 16.

As shown in FIG. 5, the junction box 41 is disposed under the driver's seat. Accordingly, the height of a section of the floor panel 100 at which the first slide rails 45 and the second slide rails 46 are disposed is the same as the height of a section of the floor panel 100 between the driver's seat and the front passenger seat.

The second-row seats 31 are disposed on the first slide rails 45. The second-row seats 31 are configured to be slidable in the vehicle front-rear direction along the first slide rails 45. The third-row seats 32 are disposed on the second slide rails 46. The third-row seats 32 are configured to be slidable in the vehicle front-rear direction along the second slide rails 46.

Devices Disposed Under the Floor Panel 100

Figure 7:
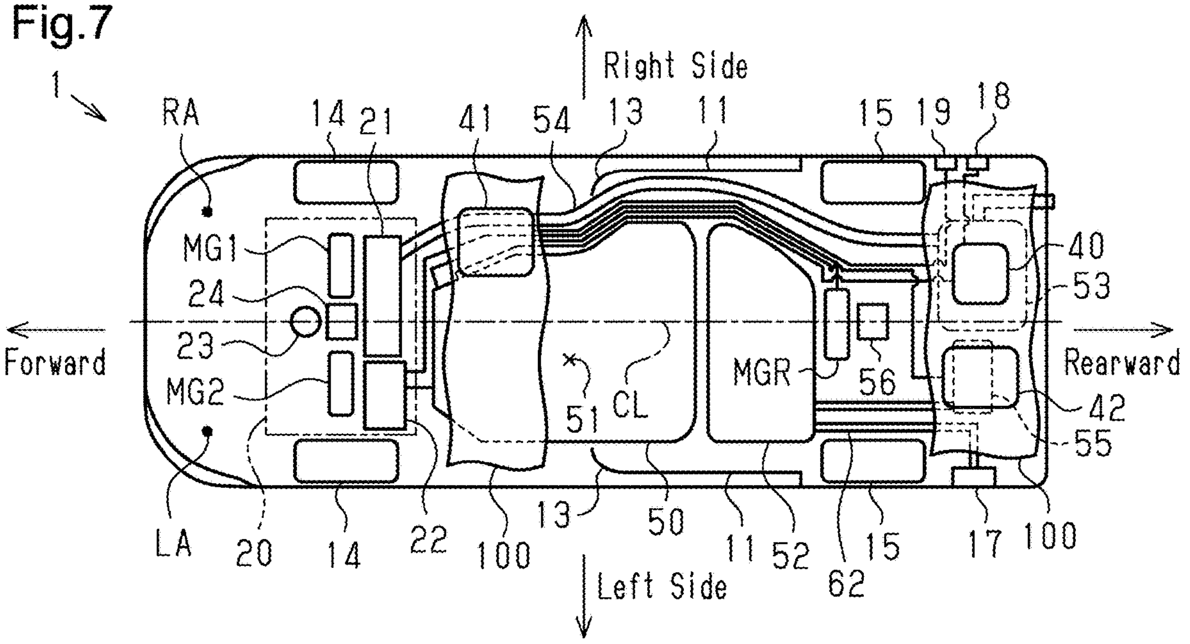
FIG. 7 is a schematic diagram of an arrangement of devices disposed under the floor panel in the plug-in hybrid electric vehicle shown in FIG. 1.

FIG. 7 is a plan view schematically showing the arrangement of devices disposed under the floor panel 100. FIG. 7 schematically shows the arrangement of the vehicle on-board charger 40, the junction box 41, and the DC/DC converter 42 disposed on the floor panel 100. The plug-in hybrid electric vehicle 1 is divided into a right area RA and a left area LA with a center line CL, indicating the center in the vehicle width direction, serving as a boundary.

The battery 50 is disposed so as to extend over both the right area RA and the left area LA. The battery 50 is disposed closer to the left side of the vehicle 1 than to the right side. A center of gravity 51 of the battery 50 is positioned in the left area LA. That is, the battery 50 is offset in the vehicle width direction so that the center of gravity 51 of the battery 50 is displaced from the center line CL in the vehicle width direction.

The plug-in hybrid electric vehicle 1 includes the guide rails 11, which are located under the floor panel 100 and slidably support the sliding doors 4. The guide rails 11 are arranged so as to overlap with a part of the battery 50 in the vehicle front-rear direction. Each guide rail 11 includes a curved portion 13 that extends forward so as to curve inward in the vehicle width direction. When the sliding door 4 is closed, the sliding door 4 is pulled inward in the vehicle width direction along the curved portion 13 of the guide rail 11.

An exhaust pipe 54 configured to guide exhaust gas from the engine 21 rearward is disposed under the floor panel 100. The exhaust pipe 54 connects the engine 21 to the muffler 53. The exhaust pipe 54 is disposed closer to the right side of the vehicle 1 than to the left side. The exhaust pipe 54 is disposed in the right area RA. The exhaust pipe 54 is disposed toward the side opposite to the side toward which the battery 50 is disposed in the vehicle width direction. The exhaust pipe 54 is disposed between the battery 50 and the guide rail 11 in the vehicle width direction. The exhaust pipe 54 is bent outward in the vehicle width direction along the curved portion 13 of the corresponding guide rail 11.

The fuel tank 52 is disposed rearward of the battery 50. The fuel tank 52 is connected to the fuel inlet 17 via a fuel supply pipe 62.

A fuel vapor recovery device 55 is disposed rearward of the rear-wheel drive motor-generator MGR and to a side of the muffler 53 in the vehicle width direction. The fuel vapor recovery device 55 is a canister that adsorbs fuel vapor gas generated inside the fuel tank 52.

The vehicle on-board charger 40 is connected to the battery 50 via a wire harness. The wire harness connecting the vehicle on-board charger 40 to the battery 50 is routed between the battery 50 and the exhaust pipe 54.

The junction box 41 is connected to the battery 50 via a wire harness. The wire harness connecting the junction box 41 to the battery 50 is routed between the battery 50 and the exhaust pipe 54.

The DC/DC converter 42 is connected to the junction box 41 via a wire harness. The wire harness connecting the DC/DC converter 42 to the junction box 41 is routed between the battery 50 and the exhaust pipe 54.

The junction box 41 is connected to the second charging port 19 via a wire harness. The wire harness connecting the junction box 41 to the second charging port 19 is routed between the battery 50 and the exhaust pipe 54.

The vehicle on-board charger 40 is connected to the first charging port 18 via a wire harness.

Drive System of the Plug-In Hybrid Electric Vehicle 1

Figure 8:
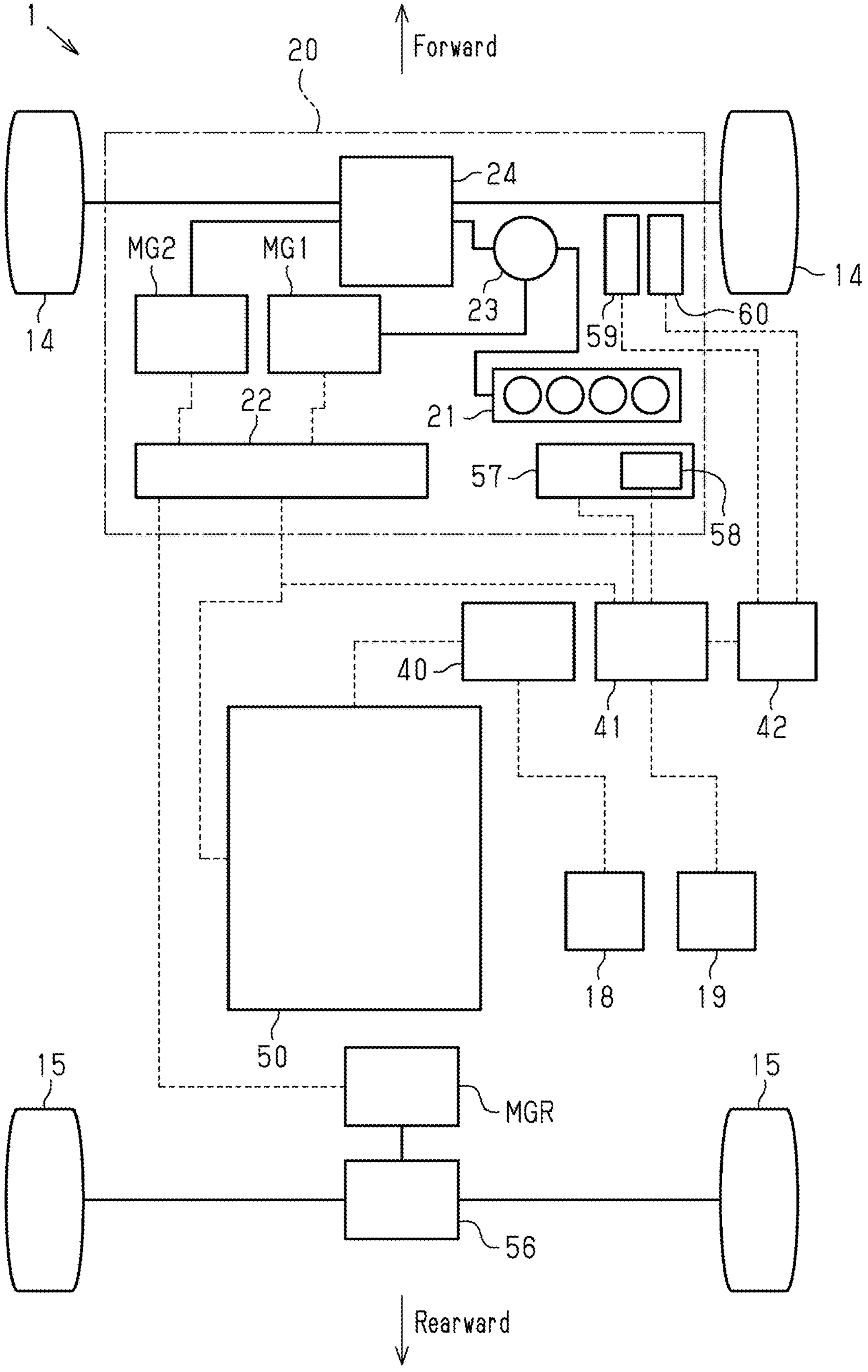
FIG. 8 is a schematic diagram of a configuration of a drive system and a configuration of an electric system in the plug-in hybrid electric vehicle shown in FIG. 1.

FIG. 8 schematically shows a configuration of a drive system and a configuration of an electric system in the plug-in hybrid electric vehicle 1 of the present embodiment.

As shown in FIG. 8, the second motor-generator MG2 is connected to the battery 50 via the power control unit 22. The second motor-generator MG2 is coupled to the front wheels 14 via the speed reduction mechanism 24. The rotational power of the second motor-generator MG2 is transmitted to the front wheels 14 via the speed reduction mechanism 24, which is a power transmission mechanism. In other words, the second motor-generator MG2 acts as a drive motor.

The engine 21 is connected to the front wheels 14 via the power split mechanism 23 and the speed reduction mechanism 24. Like the speed reduction mechanism 24, the power split mechanism 23 is also a power transmission mechanism. The rotational power of the engine 21 is transmitted to the front wheels 14 via the power transmission mechanisms. The first motor-generator MG1 is coupled to the power split mechanism 23. The first motor-generator MG1 is a three-phase AC motor-generator. The power split mechanism 23 is a planetary gear mechanism. The power split mechanism 23 is capable of splitting the driving force among the engine 21, the first motor-generator MG1, and the front wheels 14.

The first motor-generator MG1 generates electric power by receiving the driving force of the engine 21 and/or the driving force from the front wheels 14. The first motor-generator MG1 acts as a starter to drive the crankshaft, which is the output shaft of the engine 21, when initiating the engine 21. In this case, the first motor-generator MG1 acts as an electric motor that generates a driving force in response to supply of electric power from the battery 50. In other words, the first motor-generator MG1 acts as a drive motor.

The first motor-generator MG1 and the second motor-generator MG2 are connected to the battery 50 via the power control unit 22. AC power generated by the first motor-generator MG1 is converted into DC power by the power control unit 22, and the battery 50 is charged with the DC power. In other words, the power control unit 22 acts as an inverter.

The DC power of the battery 50 is converted into AC power by the power control unit 22, and supplied to the second motor-generator MG2. When the plug-in hybrid electric vehicle 1 is decelerated, the second motor-generator MG2 generates electric power using the driving force from the front wheels 14. The battery 50 is charged with the electric power generated by the second motor-generator MG2. In other words, the plug-in hybrid electric vehicle 1 performs charging through regenerative braking. In this case, the second motor-generator MG2 acts as a power generator. AC power generated by the second motor-generator MG2 is converted into DC power by the power control unit 22, and the battery 50 is charged with the DC power.

The rear-wheel drive motor-generator MGR is connected to the battery 50 via the power control unit 22. The rear-wheel drive motor-generator MGR is coupled to the rear wheels 15 via the rear-wheel speed reduction mechanism 56. The DC power of the battery 50 is converted into AC power by the power control unit 22, and supplied to the rear-wheel drive motor-generator MGR. The rear-wheel drive motor-generator MGR is an electric motor that drives the rear wheels 15 by using electric power supplied from the battery 50. In other words, the rear-wheel drive motor-generator MGR acts as a drive motor.

When the plug-in hybrid electric vehicle 1 is decelerated, the rear-wheel drive motor-generator MGR generates electric power using the driving force from the rear wheels 15. The battery 50 is charged with electric power generated by the rear-wheel drive motor-generator MGR. In this case, the rear-wheel drive motor-generator MGR acts as a generator. AC power generated by the rear-wheel drive motor-generator MGR is converted into DC power by the power control unit 22, and the battery 50 is charged with the DC power.

Electric System of the Plug-In Hybrid Electric Vehicle 1

As shown in FIG. 8, the plug-in hybrid electric vehicle 1 includes the vehicle on-board charger 40, the junction box 41, and the DC/DC converter 42. Further, the plug-in hybrid electric vehicle 1 includes the first charging port 18 and the second charging port 19 as charging ports into which charging plugs are inserted from the outside of the vehicle 1. The first charging port 18 is used for standard charging, which is performed using an AC power supply such as 100 V or 200 V. The second charging port 19 is used for fast charging with a high-voltage DC power supply, such as 50 kW.

As shown in FIG. 8, the vehicle on-board charger 40 is connected to the battery 50 via a wire harness. The junction box 41 is connected to the battery 50 via a wire harness. The DC/DC converter 42 is connected to the junction box 41 via a wire harness.

The vehicle on-board charger 40 is connected to the first charging port 18 via a wire harness. The vehicle on-board charger 40 charges the battery 50 by converting AC power input from an AC power supply connected to the first charging port 18 into DC power and outputting the DC power. That is, the plug-in hybrid electric vehicle 1 can use an AC power supply as an external electrical power supply for charging the battery 50.

The junction box 41 has a feature of distributing electric power from the battery 50 to multiple devices. For example, DC power from the battery 50 is supplied to the DC/DC converter 42, the air conditioner 57, and the water heater 58 via the junction box 41.

The air conditioner 57 performs air conditioning of the passenger compartment 16 using the electric power supplied from the battery 50. The water heater 58 heats water into hot water using the electric power supplied from the battery 50. The air conditioner 57 uses the hot water as a heat source.

The junction box 41 is connected to the second charging port 19 via a wire harness. A DC power supply is connected to the second charging port 19. The DC power input from the DC power supply connected to the second charging port 19 is supplied to the battery 50 via the junction box 41. That is, the plug-in hybrid electric vehicle 1 can use a DC power supply as an external electrical power supply for charging the battery 50.

The DC/DC converter 42 decreases the voltage of the battery 50 and supplies the decreased voltage to multiple auxiliary devices. The auxiliary devices include an electric power steering system 59 and an electric oil pump 60 disposed in the engine compartment 20. The electric power steering system 59 is a mechanism that assists the driver's steering operation. The electric oil pump 60 is a mechanism that draws lubricating oil and uses the lubricating oil to lubricate the engine 21.

Operation of Present Embodiment

In a case in which the vehicle on-board charger 40 is disposed under the floor panel 100, the battery 50 needs to be reduced in size to be disposed under the floor panel 100. Also, achieving a low floor design may become difficult. On the other hand, in a case in which the vehicle on-board charger 40 is disposed above the floor panel 100, a flat floor design cannot be achieved depending on the position at which the vehicle on-board charger 40 is disposed.

In the present embodiment, since the vehicle on-board charger 40 is disposed above the floor panel 100, the plug-in hybrid electric vehicle 1 has a space for mounting a relatively large battery 50 under the floor panel 100 without raising the height of the floor panel 100. Further, since the vehicle on-board charger 40 is disposed rearward of the axle of the rear wheels 15, the floor on which the first slide rails 45 and the second slide rails 46 are disposed can be made flat in an area including the vicinity of the rear wheels 15. This allows relatively long first slide rails 45 to be disposed on the floor. Accordingly, there is a sufficient sliding range for the second-row seats 31.

Advantages of the Present Embodiment (1) The above-described plug-in hybrid electric vehicle 1 achieves a relatively low and flat floor and ensures a relatively large passenger compartment while allowing the large battery 50 to be mounted.

(2) In the plug-in hybrid electric vehicle 1, the DC/DC converter 42 is disposed rearward of the axle of the rear wheels 15 and above the floor panel 100. In a case in which the DC/DC converter 42 is disposed under the floor panel 100, the battery 50 needs to be reduced in size to be disposed under the floor panel 100. Also, achieving a low floor design may become difficult. In contrast, in a case in which the DC/DC converter 42 is disposed above the floor panel 100, a flat floor design cannot be achieved depending on the position at which the DC/DC converter 42 is disposed. In the present embodiment, since the DC/DC converter 42 is disposed above the floor panel 100, it is possible to have a space for mounting a relatively large battery 50 under the floor panel 100 without raising the height of the floor panel 100. Further, since the DC/DC converter 42 is disposed rearward of the axle of the rear wheels 15, the floor on which the first slide rails 45 and the second slide rails 46 are disposed can be made flat in an area including the vicinity of the rear wheels 15. This allows relatively long first slide rails 45 to be disposed on the floor. Therefore, the above-described plug-in hybrid electric vehicle 1 ensures sufficient sliding range for the second-row seats 31.

(3) In the plug-in hybrid electric vehicle 1, the DC/DC converter 42 is disposed to the side of the vehicle on-board charger 40 in the vehicle width direction. With the above-described configuration, compared to a case in which the DC/DC converter 42 is disposed forward of or rearward of the vehicle on-board charger 40 in the length direction of the vehicle, a range in which the floor is flat in the length direction of the vehicle is extended. The wider the range in which the floor is flat in the length direction of the vehicle, the greater the lengths of the first slide rails 45 that can be disposed on the floor become. Therefore, the above-described plug-in hybrid electric vehicle 1 ensures sufficient sliding range for the second-row seats 31.

(4) The plug-in hybrid electric vehicle 1 includes the first charging port 18 and the second charging port 19 as charging ports into which charging plugs are inserted from the outside of the vehicle 1. The first charging port 18 and the second charging port 19 are disposed on a side surface of the vehicle 1 closer to the vehicle on-board charger 40 and rearward of the sliding door 4. The vehicle on-board charger 40 and the first charging port 18 are connected to each other by a wire harness. In the above-described plug-in hybrid electric vehicle 1, the first charging port 18 is installed on the side surface of the vehicle 1 on the side close to the vehicle on-board charger 40. Thus, a relatively short wire harness can be used to connect the vehicle on-board charger 40 and the first charging port 18 to each other. The shorter a wire harness, the lighter the wire harness becomes. Accordingly, the weight of the vehicle is reduced. Additionally, a shorter wire harness reduces power loss within the wire harness. Therefore, the above-described plug-in hybrid electric vehicle 1 reduces the weight of the vehicle 1 and the power loss in the wire harness.

(5) The plug-in hybrid electric vehicle 1 includes the junction box 41, which distributes the electric power supplied from the battery 50. The junction box 41 is disposed below the first-row seats 30 and above the floor panel 100. In a case in which the junction box 41 is disposed under the floor panel 100, the battery 50 needs to be reduced in size to be disposed under the floor panel 100. Also, achieving a low floor design may become difficult. On the other hand, in a case in which the junction box 41 is disposed above the floor panel 100, it is possible that a flat floor design cannot be achieved depending on the position at which the junction box 41 is disposed. In the present embodiment, since the junction box 41 is disposed above the floor panel 100, the plug-in hybrid electric vehicle 1 has a space for mounting a relatively large battery 50 under the floor panel 100 without raising the height of the floor panel 100. Thus, the plug-in hybrid electric vehicle 1 achieves a relatively low and flat floor and ensures a relatively large passenger compartment while allowing the large battery 50 to be mounted. Further, since the junction box 41 is disposed below the first-row seats 30, the floor on which the slide rails are disposed can be made flat in an area including the vicinity of the rear wheels 15. This allows relatively long first slide rails 45 to be disposed on the floor. Accordingly, a sufficient sliding range for the second-row seats 31 is ensured.

(6) The first-row seats 30 include two seats that are a right seat and a left seat. These two seats are the driver's seat and the front passenger seat. The junction box 41 is disposed under one of the two seats. A portion of the floor panel 100 positioned between the two seats is at the same height as a portion of the floor panel 100 on which the slide rails are disposed. With the above-described configuration, the floor located between the right seat and the left seat included in the first-row seats 30 is a flat floor continuous with the floor rearward of the first-row seats 30. Thus, an occupant can easily move in the passenger compartment 16 between the right seat and the left seat without exiting the vehicle 1. That is, in the above-described plug-in hybrid electric vehicle 1, an occupant can move between the second-row seats 31 and the first-row seats 30 without exiting the passenger compartment 16.

Modifications

The above-described embodiment may be modified as follows. The above-described embodiment and the following modifications can be combined as long as the combined modifications remain technically consistent with each other.

The DC/DC converter 42 does not necessarily need to be disposed rearward of the axle of the rear wheels 15 and above the floor panel 100. For example, the DC/DC converter 42 may be disposed below the first-row seats 30 and above the floor panel 100.

The DC/DC converter 42 does not necessarily need to be disposed to the side of the vehicle on-board charger 40 in the vehicle width direction. For example, the DC/DC converter 42 may be disposed forward of the vehicle on-board charger 40 in the vehicle length direction. For example, the DC/DC converter 42 may be disposed rearward of the vehicle on-board charger 40 in the vehicle length direction.

The position at which the first charging port 18, which is connected to the vehicle on-board charger 40, is disposed is not limited to the side surface of the vehicle 1 on the side closer to the vehicle on-board charger 40 and rearward of the sliding door 4. For example, the first charging port 18 may be disposed on a side surface of the vehicle 1 on the side farther from the vehicle on-board charger 40.

The plug-in hybrid electric vehicle 1 does not necessarily need to include the junction box 41. For example, if the battery 50 has a feature of distributing current, the plug-in hybrid electric vehicle 1 does not necessarily need to include the junction box 41.

The junction box 41 may be disposed at a position other than under the right seat of the first-row seats 30. For example, the junction box 41 may be disposed under the left seat of the first-row seats 30. For example, the junction box 41 may be disposed between the right seat and the left seat of the first-row seats 30.

The plug-in hybrid electric vehicle 1 may be an autonomous vehicle. In this case, the plug-in hybrid electric vehicle 1 does not necessarily need to include the driver's seat. In this case, the plug-in hybrid electric vehicle 1 includes a right seat and a left seat as the first-row seats 30. The junction box 41 is disposed under the right seat. However, also in this case, the junction box 41 may be disposed at a position other than the position under the right seat. For example, the junction box 41 may be disposed under the left seat. For example, the junction box 41 may be disposed between the right seat and the left seat.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A minivan-type plug-in hybrid electric vehicle in which a passenger compartment and a cargo space are not separated by a partition, the vehicle comprising:
- an engine compartment provided in front of the passenger compartment in a vehicle front-rear direction;
- power sources including an engine and a motor;
- a fuel tank configured to store fuel to be supplied to the engine;

a battery configured to store electric power to be supplied to the motor;

a vehicle on-board charger configured to charge the battery with power supplied from outside of the plug-in hybrid electric vehicle;

a converter configured to convert a voltage of electric power supplied from the battery;

a power transmission mechanism configured to transmit rotational power of the engine and the motor to front wheels;

an inverter configured to drive the motor;

an exhaust pipe configured to guide exhaust gas from the engine rearward in the vehicle front-rear direction;

a first-row seat arranged on a floor panel that forms a floor surface of the passenger compartment;

a second-row seat disposed on the floor panel so as to be positioned rearward of the first-row seat in the vehicle front-rear direction; and a slide rail disposed on the floor panel so as to extend in the vehicle front-rear direction, wherein the engine, the motor, the power transmission mechanism, and the inverter are disposed in the engine compartment, in the vehicle front-rear direction, the first-row seat is positioned rearward of the front wheels, and the second-row seat is positioned forward of rear wheels, the second-row seat is configured to be slidable on the floor panel along the slide rail in the vehicle front-rear direction, the battery, the fuel tank, and the exhaust pipe are disposed under the floor panel, and the vehicle on-board charger is disposed on the floor panel so as to be positioned rearward of an axle of the rear wheels in the vehicle front-rear direction.

2. The plug-in hybrid electric vehicle according to claim 1, wherein the converter is disposed on the floor panel so as to be positioned rearward of the axle of the rear wheels in the vehicle front-rear direction.

3. The plug-in hybrid electric vehicle according to claim 2, wherein the converter is disposed to a side of the vehicle on-board charger in a vehicle width direction.

4. The plug-in hybrid electric vehicle according to claim 1, further comprising:

a sliding door provided on at least a first side surface of a first side surface and a second side surface of the plug-in hybrid electric vehicle; and a charging port configured such that a charging plug is inserted into the charging port from outside of the plug-in hybrid electric vehicle, wherein the first side surface is a side surface closer to the vehicle on-board charger than the second side surface is, the charging port is disposed on the first side surface so as to be positioned rearward of the sliding door in the vehicle front-rear direction, and the vehicle on-board charger and the charging port are connected to each other by a wire harness.

5. The plug-in hybrid electric vehicle according to claim 1, further comprising a junction box configured to distribute the electric power supplied from the battery, wherein the junction box is disposed below the first-row seat and above the floor panel.

6. The plug-in hybrid electric vehicle according to claim 5, wherein the first-row seat includes two seats that are a right seat and a left seat, the junction box is disposed under one of the two seats, and a portion of the floor panel positioned between the two seats is at a same height as a portion of the floor panel on which the slide rail is disposed.

* * * * *